United States Patent [19]
Willner, Jr.

[11] Patent Number: 5,119,563
[45] Date of Patent: Jun. 9, 1992

[54] SPAGHETTI FORK

[76] Inventor: Lucas Willner, Jr., 14992 Kilbourne, Detroit, Mich. 48213

[21] Appl. No.: 700,479

[22] Filed: May 15, 1991

[51] Int. Cl.⁵ .......................................... A47J 43/28
[52] U.S. Cl. ...................................................... 30/322
[58] Field of Search .............. 30/322, 323, 137, 147, 30/148, 150; D7/653; 294/55.5

[56] References Cited

U.S. PATENT DOCUMENTS

| D. 236,069 | 7/1975 | Braid | 30/322 X |
| 2,664,630 | 1/1954 | Lawson | 30/322 |
| 2,707,651 | 5/1955 | Ott | 30/322 UX |

FOREIGN PATENT DOCUMENTS 260049  2/1949  Switzerland .......................... 30/322

Primary Examiner—Douglas D. Watts
Attorney, Agent, or Firm—Robert G. Mentag

[57] ABSTRACT

A fork, especially adapted for eating spaghetti, having an elongated handle with a plurality of elongated tines mounted on the lower end of the handle. The tines are disposed parallel to each other, and they extend from the lower end of the handle parallel to and spaced about the longitudinal axis of the handle.

8 Claims, 1 Drawing Sheet

U.S. Patent     June 9, 1992     5,119,563
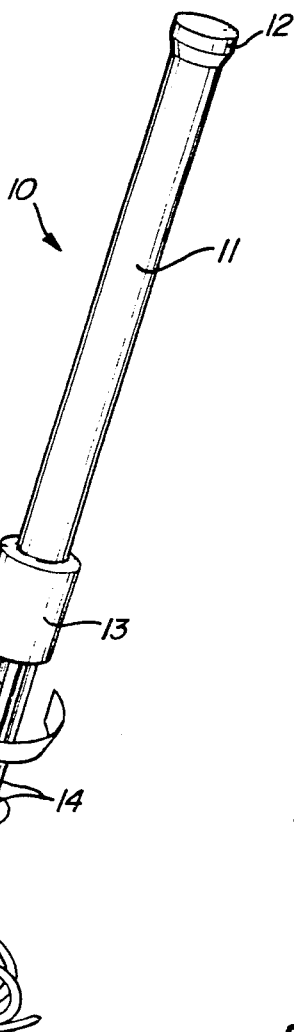
Fig-1
Fig-6
Fig-7
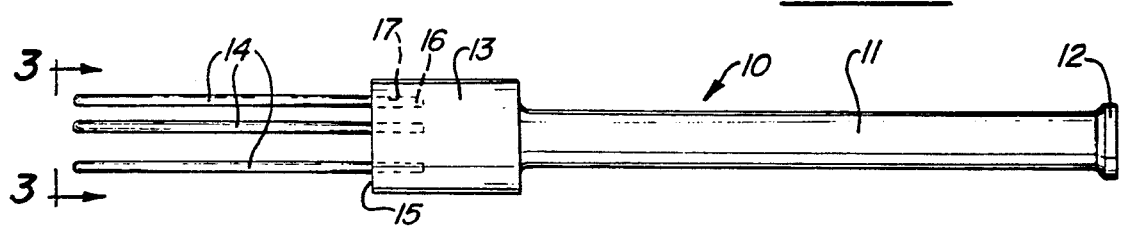
Fig-2
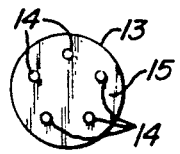
Fig-3
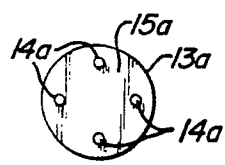
Fig-4
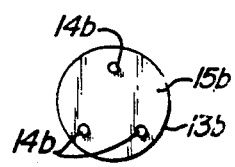
Fig-5

SPAGHETTI FORK

BACKGROUND OF THE INVENTION

1. Technical Field

The field of art to which this invention pertains may be generally located in the class of devices relating to forks. Class 30, Cutlery, United States Patent Office Classification, appears to be the applicable general area of art to which the subject matter similar to this invention has been classified in the past.

2. Description of the Prior Art

Heretofore, the only utensil normally available for eating spaghetti was a conventional fork, used either alone or in combination with a spoon. When using a conventional fork, the fork is inserted into the spaghetti on a plate and twisted, in an attempt to wind up some of the spaghetti on the tines of the fork. However, a person not skilled in the use of a conventional fork is normally not able to wind up spaghetti on the fork. In conjunction with the use of a conventional fork, a spoon is sometimes used, to help force the spaghetti onto the tines of the fork. A disadvantage of conventional forks when using them for eating spaghetti is that all of the tines or prongs thereon lie in the same flat or curved plane, and that configuration retards the efficient winding of spaghetti on the conventional fork tines or prongs.

SUMMARY OF THE INVENTION

In accordance with the present invention, a novel spaghetti fork is provided which includes an elongated handle that is provided with a plurality of elongated, longitudinally disposed tines on one end thereof. The tines are laterally apart from each other in a direction transverse to the longitudinal axis of the handle. The tines may be made separately and mounted on the lower end of the handle or they may be made integral with the handle. In one embodiment, the longitudinally extended tines were disposed in a circular arrangement and each tine had a circular cross section. The tines may be provided with other cross section shapes, such as triangular or square, and be arranged in a non-circular cross section arrangement.

BRIEF DESCRIPTION OF THE DRAWINGS

FIG. 1 is an elevation perspective view of a spaghetti fork made in accordance with the principles of the present invention and showing the fork in use.

FIG. 2 is a side view of a spaghetti fork made in accordance with the principles of the present invention.

FIG. 3 is a left end view of the spaghetti fork structure shown in FIG. 2, taken along the line 3—3 thereof, and looking in the direction of the arrows, and showing the use of five tines on the spaghetti fork.

FIGS. 4 and 5 are end views, similar to FIG. 3, of spaghetti forks made in accordance with the principles of the present invention, showing the use of four and three tines on a spaghetti fork, respectively, and showing the tines being arranged in a square disposition and a triangular disposition, respectively.

FIG. 6 is a cross section view of a another type of tine that may be employed in the structure of a spaghetti fork, and which shows the tine having a triangular configuration.

FIG. 7 is a cross section view of another type of tine that may be employed in the structure of a spaghetti fork, and showing the cross section of the tine as being square.

DESCRIPTION OF THE PREFERRED EMBODIMENTS

Referring now to the drawings, and in particular to FIGS. 1-3. the numeral 10 generally designates a spaghetti fork made in accordance with the invention. The spaghetti fork 10 includes an elongated, cylindrical handle 11 which has an enlarged upper end 12 and a cylindrically shaped, enlarged lower end 13. As shown in FIGS. 2 and 3, a plurality of cylindrical, elongated tines 14 are mounted in the enlarged lower end portion 13. The tines 14 are circular in cross section and are disposed in a circular disposition. As shown in FIGS. 2 and 3, the tines 14 are unaligned, and are laterally spaced apart from each other. As shown in FIG. 2, the upper end 16 of the tines 14 are fixedly mounted by any suitable means in a separate bore 17 formed in the outer end portion of the enlarged lower end 13 of the spaghetti fork 10. The tine ends 16 are fixedly secured in the bores 17 by any suitable means, as by a press fit or a suitable adhesive.

It will be understood that the tines 14 may be formed integral with the handle 11. It will be further understood that the spaghetti fork 10 may be made from any suitable material, as for example a suitable metal or plastic material. The tines 14 may be made from a stainless steel material and operatively mounted on the lower end 13 of the spaghetti fork 10.

FIG. 4 is a view similar to FIG. 3, of a modified spaghetti fork in which four elongated, cylindrical tines 14a are employed. The reference numerals used in FIG. 4 are the same as used in the first embodiment of FIGS. 1 thru 3, followed by the small letter "a". In the embodiment of FIG. 4, the tines 14a are arranged in a square disposition.

FIG. 5 is a view similar to FIG. 3, of another modified spaghetti fork in which three elongated, cylindrical tines 14b are employed. The reference numerals used in FIG. 5 are the same as used in the first embodiment of FIGS. 1 thru 3, followed by the small letter "b". In the embodiment of FIG. 5, the tines 14b are arranged in a triangular disposition.

FIG. 6 shows the cross section of a tine 14c made in a triangular configuration.

FIG. 7 shows the cross section of a tine 14d made with a square cross section.

It will be seen that the spaghetti fork of the present invention may be used with one hand. The fork is grasped by the handle 11 and put straight down into the spaghetti and turned until the tines 14 are filled up with the spaghetti, after which the fork is pivoted and inserted into the mouth of the user. The spaghetti fork 10 of the present invention may be used for eating not only spaghetti, but also meat, potatoes, vegetables and salads. An advantage of the spaghetti fork of the present invention is that the food does not slide off of the tines 14, as frequently happens in the use of a conventional fork. Accordingly, the spaghetti fork 10 can be used by elderly people with the use of one hand, and it permits an elderly person to quickly and easily secure the food to the tines 14, without the food sliding off of the tines 14.

In one embodiment the handle 11 was made to a length of four inches and to a diameter of ⅜ of an inch. The lower end 13 was made to a length of one inch and to a diameter of ¾ of an inch. The tines 14 were 1/16 of an inch in diameter and made to a length of two inches.

Five tines 14 were used, and they were disposed in a circular arrangement, as in FIG. 3, and spaced 72 degrees apart. The tines were made from a stainless steel, and the handle 11 and lower end 13 were made from wood.

What is claimed is:

1. A spaghetti fork (10) comprising:
   (a) a cylindrical handle (11) having a lower end surface (15), and a longitudinal rotational axis;
   (b) said lower end surface being perpendicular to said longitudinal rotational axis; and,
   (c) a plurality of elongated tines (14) which are laterally spaced apart so as to permit insertion of the tines into the mouth of a user of the fork, and which have one end of each of said tines mounted directly on the lower end surface (15) of the handle, and in a position parallel to and around the longitudinal rotational axis of the cylindrical fork handle (11), and have the other end of each of said tines extending longitudinally outward from said handle lower end surface (15) and terminating with a blunt shape, whereby, a user of the fork may grasp the cylindrical handle and stick the tines into a serving of spaghetti on a plate and rotate the handle to wind up a portion of the spaghetti on the tines, and then insert the tines carrying the spaghetti into the user's mouth and to permit closing of the user's mouth over the tines while the fork is removed from the mouth to leave the spaghetti in the user's mouth.

2. A spaghetti fork (10) as defined in claim 1, wherein:
   (a) the tines (14) are separately made and mounted in the lower end (15) of the cylindrical handle.

3. A spaghetti fork (10), as defined in claim 1, wherein:
   (a) the tines (14) are made integral with the cylindrical fork handle (11).

4. A spaghetti fork (10), as defined in claim 1, wherein:
   (a) the tines (14) are disposed in a circular arrangement about the longitudinal rotational axis of the cylindrical fork handle (11).

5. A spaghetti fork (10), as defined in claim 1, wherein:
   (a) the tines (14) are disposed in a square arrangement about the longitudinal rotational axis of the fork handle (11).

6. A spaghetti fork (10), as defined in claim 1, wherein:
   (a) the tines (14) are disposed in a triangular arrangement about the longitudinal rotational axis of the fork handle (11).

7. A spaghetti fork (10), as defined in claim 1, wherein:
   (a) the tines (14) are circular in cross section.

8. A spaghetti fork (10), as defined in claim 1, wherein:
   (a) the tines (14) are non-circular in cross section.

* * * * *